US010075816B2

(12) United States Patent
Huang

(10) Patent No.: US 10,075,816 B2
(45) Date of Patent: Sep. 11, 2018

(54) MOBILE DEVICE POSITION DETERMINING METHOD AND DETERMINING APPARATUS, AND MOBILE DEVICE

(71) Applicant: BEIJING ZHIGU TECH CO., LTD., Beijing (CN)

(72) Inventor: Weicai Huang, Beijing (CN)

(73) Assignee: BEIJING ZHIGU TECH CO., LTD., Beijing (CN)

( * ) Notice: Subject to any disclaimer, the term of this patent is extended or adjusted under 35 U.S.C. 154(b) by 0 days.

(21) Appl. No.: 15/510,564

(22) PCT Filed: Sep. 10, 2015

(86) PCT No.: PCT/CN2015/089308
§ 371 (c)(1),
(2) Date: Mar. 10, 2017

(87) PCT Pub. No.: WO2016/037577
PCT Pub. Date: Mar. 17, 2016

(65) Prior Publication Data
US 2017/0257747 A1    Sep. 7, 2017

(30) Foreign Application Priority Data
Sep. 13, 2014   (CN) .......................... 2014 1 0466352

(51) Int. Cl.
H04W 4/02   (2018.01)
H04W 4/04   (2009.01)

(52) U.S. Cl.
CPC ........... *H04W 4/025* (2013.01); *H04W 4/043* (2013.01)

(58) Field of Classification Search
CPC ................................................... H04W 4/025
See application file for complete search history.

(56) References Cited

U.S. PATENT DOCUMENTS 7,430,439 B2 *   9/2008   Griffin .............. H04M 1/72522
                                                  455/550.1
9,442,564 B1 *   9/2016   Dillon .................... G06F 3/012
(Continued)

FOREIGN PATENT DOCUMENTS

CN    103064519 A    4/2013
CN    103369135 A    10/2013
(Continued)

OTHER PUBLICATIONS

T. Morito, T. Hayashi, and H. Morikawa. User Posture and Movement Estimation Based on 3-Axis Acceleration with a Sensor Network, in Proceedings of University of Tokyo—INRIA—Ecole des Mines Paris—INRETS Joint Symposium on Electronics for Secure Life, Jul. 2008.*

(Continued)

*Primary Examiner* — Nathan Mitchell

(57) ABSTRACT

Embodiments of the present disclosure disclose a mobile device position determining method and determining apparatus, and a mobile device comprising the determining apparatus. The method comprises: determining that a mobile device is in a first state, wherein in the first state, the mobile device is located at a first position relative to a user; determining that a state of the mobile device is changed from the first state to a second state; acquiring position difference information between a second position of the mobile device relative to the user in the second state and the first position; and determining the second position at least according to the first position and the position difference information. The technical solutions of the embodiments of the present disclosure can conveniently and accurately determine a position of a mobile device relative to a user, so as to make previous preparations for adjusting a function state thereof (Continued)

according to an environment where the mobile device is located.

20 Claims, 5 Drawing Sheets

(56) References Cited

U.S. PATENT DOCUMENTS

| | | | | |
|---|---|---|---|---|
| 2002/0010008 | A1* | 1/2002 | Bork | H04M 19/041 455/567 |
| 2004/0180649 | A1* | 9/2004 | Vogel | H04M 1/72563 455/418 |
| 2006/0116175 | A1* | 6/2006 | Chu | H04M 1/72569 455/567 |
| 2007/0037605 | A1* | 2/2007 | Logan | G08B 13/1427 455/567 |
| 2007/0075965 | A1* | 4/2007 | Huppi | H04M 1/72563 345/156 |
| 2008/0045207 | A1* | 2/2008 | Ahn | H04M 1/7258 455/428 |
| 2008/0132196 | A1* | 6/2008 | Soh | H04M 1/72569 455/404.1 |
| 2009/0312049 | A1* | 12/2009 | Isomursu | H04M 1/72569 455/550.1 |
| 2010/0048256 | A1* | 2/2010 | Huppi | H04M 1/72563 455/574 |
| 2010/0304757 | A1* | 12/2010 | Yoshioka | G01B 21/02 455/456.1 |
| 2012/0157114 | A1 | 6/2012 | Alameh et al. | |
| 2013/0184007 | A1* | 7/2013 | Hategan | G06Q 30/0259 455/456.1 |
| 2014/0066124 | A1 | 3/2014 | Novet | |
| 2014/0213290 | A1* | 7/2014 | Yamada | G01S 5/14 455/456.1 |
| 2016/0007158 | A1* | 1/2016 | Venkatraman | H04W 4/023 455/456.2 |

FOREIGN PATENT DOCUMENTS

| | | |
|---|---|---|
| CN | 104244182 A | 12/2014 |
| JP | 2015-192177 A | 11/2015 |

OTHER PUBLICATIONS

Y. Kawahara, H. Kurasawa and H. Morikawa, "Recognizing User Context Using Mobile Handsets with Acceleration Sensors," 2007 IEEE International Conference on Portable Information Devices, Orlando, FL, 2007, pp. 1-5.*
International Search Report and Written Opinion for Application No. PCT/CN2015/089308, dated Nov. 25, 2015, 8 pages.

* cited by examiner

MOBILE DEVICE POSITION DETERMINING METHOD AND DETERMINING APPARATUS, AND MOBILE DEVICE

CROSS-REFERENCE TO RELATED APPLICATIONS

This application is a national phase application of International Application No. PCT/CN2015/089308, filed on Sep. 10, 2015, which claims the benefit of priority to Chinese Patent Application No. 201410466352.6, filed on Sep. 13, 2014, and entitled "Mobile Device Position Determining Method and Determining Apparatus, and Mobile Device", each of which is incorporated herein by reference in its entirety.

TECHNICAL FIELD

The present disclosure relates to positioning technologies, and in particular, to a mobile device position determining method and determining apparatus, and a mobile device.

BACKGROUND

Along with the development of technologies, mobile devices become more and more intelligent. Some mobile devices may adjust some functional devices thereof according to environment information, for example, adjust the luminance of a screen automatically according to different brightness of ambient light, and therefore, a sensing capability of a mobile device on an environment thereof is increasingly emphasized.

SUMMARY

A possible objective of embodiments of the present disclosure is to provide a position determining technology of a mobile device relative to a user body.

In one aspect, embodiments of the present disclosure provide a mobile device position determining method, comprising:

determining that a mobile device is in a first state, wherein in the first state, the mobile device is located at a first position relative to a user;

determining that a state of the mobile device is changed from the first state to a second state;

acquiring position difference information between a second position of the mobile device relative to the user in the second state and the first position; and determining the second position at least according to the first position and the position difference information.

In a second aspect, embodiments of the present disclosure provide a mobile device position determining apparatus, comprising:

a first state determining module, configured to determine that a mobile device is in a first state, wherein in the first state, the mobile device is located at a first position relative to a user;

a second state determining module, configured to determine that a state of the mobile device is changed from the first state to a second state;

a position difference acquiring module, configured to acquire position difference information between a second position of the mobile device relative to the user in the second state and the first position; and a position determining module, configured to determine the second position at least according to the first position and the position difference information.

In a third aspect, embodiments of the present disclosure provide a mobile device, comprising the mobile device position determining apparatus described in the foregoing.

In a fourth aspect, embodiments of the present disclosure provide a computer readable storage medium comprising executable instructions that, in response to execution, cause a device comprising a processor to perform operations, comprising:

determining that a mobile device is in a first state, wherein in the first state, the mobile device is located at a first position relative to a user;

determining that a state of the mobile device is changed from the first state to a second state;

acquiring position difference information between a second position of the mobile device relative to the user in the second state and the first position; and determining the second position at least according to the first position and the position difference information.

According to embodiments of the present disclosure, by using position difference information of a mobile device between a first state having a known position relative to a user and a second state having an un-known position relative to the user, a position of the mobile device relative to the user in the second state is determined; therefore, the positioning is convenient and precise, and makes previous preparations for adjusting function states thereof according to an environment where the mobile device is located.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
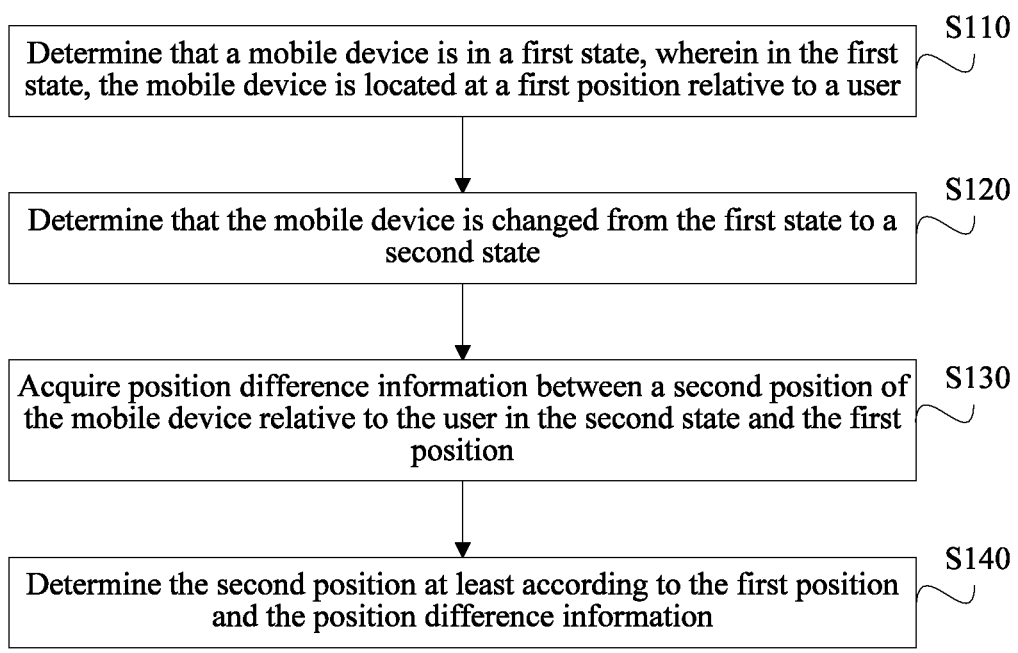
FIG. 1 is an example flow chart of steps of a mobile device position determining method according to an embodiment of the present disclosure.

Specific implementation manners of the present disclosure are further described in detail through the accompanying drawings (the same reference numerals in several accompanying drawings indicate the same elements) and embodiments. The following embodiments are used to describe the present disclosure, but are not intended to limit the scope of the present disclosure.

Persons skilled in the art should understand that terms such as "first" and "second" in the present disclosure are merely used to distinguish different steps, devices, modules or the like, and the terms neither represent any specific technical meanings nor indicate necessary logic orders of them.

As shown in FIG. 1, an embodiment of the present disclosure provides a mobile device position determining method, comprising:

S110: Determine that a mobile device is in a first state, wherein in the first state, the mobile device is located at a first position relative to a user;

S120: Determine that a state of the mobile device is changed from the first state to a second state;

S130: Acquire position difference information between a second position of the mobile device relative to the user in the second state and the first position; and S140: Determine the second position at least according to the first position and the position difference information.

For example, the mobile device position determining apparatus provided in the present disclosure can be used to execute this embodiment, and executes S110 to S140. Specifically, the mobile device position determining apparatus may be disposed in the mobile device in a manner of software, hardware, or a combination of software and hardware, or, the mobile device position determining apparatus itself is the mobile device; and the mobile device comprises, but is not limited to: a mobile phone, a tablet computer, and the like.

According to embodiments of the present disclosure, by using position difference information of a mobile device between a first state having a known position relative to a user and a second state having an un-known position relative to the user, a position of the mobile device relative to the user in the second state is determined; therefore, the positioning is convenient and precise, and makes previous preparations for adjusting function states thereof according to an environment where the mobile device is located.

The steps of embodiments of the present disclosure can be determined according to the following implementation manner.

S110: Determine that a mobile device is in a first state, wherein in the first state, the mobile device is located at a first position relative to a user.

According to embodiments of the present disclosure, the first state is a state having a known first position. For example, when a user performs an operation on a screen or a complicated operation on keys of the mobile device by using the left hand, the right hand or both hands, the user can hold the mobile device to be in front of the body to facilitate viewing by eyes of the user. For example, when a screen operation is performed on the mobile device by using both hands, the mobile device can be located in front of the user and at a specific distance under the head, for example, located in front of the user by 20-30 cm and under the head by 30-40 cm. For another example, when the mobile device is a mobile phone, when the user holds the mobile phone by the left hand or the right hand to make a call, a position of the mobile device may be determined to be at the left ear or right ear of the user.

Therefore, after it is determined that the mobile device is in a first state having a known first position, a new position of the mobile phone can be determined by using the first position corresponding to the first state as a reference point.

In some embodiments, the first state comprises: a state of the mobile device being operated by, for example, as described in the foregoing, a state of being operated by a finger of the user on the screen; or, a state of being held by the user to view text or video through the screen of the mobile device; or, a state of being held by the user at the ear for calling.

In some scenarios, it may be unnecessary to determine which hand the user uses to perform the operation; in some scenarios, information of the first state can include more detail, for example, it is determined the mobile device is held by which hand of the user, or the like.

In some embodiments, the first position corresponding to the first state can include samples obtained from multiple users.

In some embodiments, because of different statures, habits and the like of different users, first positions corresponding to that the different users use a mobile device in a first state varies. Thus, in order to improve accuracy, a first position in a first state to a user could be associated with the user. For example, a first position in a first state corresponding to a user can be acquired through learning.

In some embodiments, step S110 comprises:

determining that the mobile device is in the first state according to an instruction corresponding to an action of the user.

For example, when the user operates the screen, it is determined, according to an instruction generated correspondingly when the user operates the screen, that the mobile device is in a first state of being operated by the user on the screen. For another example, when the user answering a phone call at the ear, it may be determined, according to a handheld detection, a proximity sensing detection, or an instruction corresponding to that the phone call is connected and the like, that the mobile device is in a first state of being answered by the user at the ear.

Moreover, it may further be determined, according to various manners such as finger print, palm print, or pressure sensing, which hand is operating the mobile device.

S120: Determine that a state of the mobile device is changed from the first state to a second state.

In some scenarios, a function state of the mobile device can be determined according to a place where the mobile device is placed by the user on the body. In some embodiments, the second state comprises: a carry-on placing state of the mobile device.

The carry-on placing state comprises: a state in which the mobile device is placed in the pocket at the chest on the coat, the pocket at the hem of the coat, the pocket in the front of the trousers, the pocket at the back of the trousers, a carry-on bag, or other carry-on position(s) of the user.

When the mobile device is changed to the carry-on placing state, for example, a position of the hand of the user is changed from being on the mobile device to leaving the mobile device. In some embodiments, the step S120 of determining that the mobile device is changed to the carry-on placing state may comprise:

determining, at least according to that a state of the mobile device is changed from a handheld state to a non-handheld state, that the mobile device is changed to the carry-on placing state.

In some possible implementation manners, the determination of the handheld state may be performed by using a pressure sensor, an infrared detector, or a fingerprint reader at the periphery of the mobile device.

When an object is placed in a pocket or a bag, it can undergo a process of falling to stop. In some embodiments, the step S120 of determining that the mobile device is changed to the carry-on placing state comprises:

determining, at least according to that a state of the mobile device is changed from a falling state to a stop falling state, that the mobile device is changed to the carry-on placing state.

In some embodiments, to improve the accuracy of determination, it may be determined that the mobile device is changed to the carry-on placing state simultaneously according to changes of the two states mentioned above. Moreover, a person skilled in the art may know that, other possible state change may also be used in the embodiments of the present disclosure to determine that the mobile device is changed to the carry-on placing state, for example, the determination may be performed with the help of change of ambient light from a light state to a dark state.

In some embodiments, a state of the mobile device may be directly changed from the first state to the second state. In some embodiments, a state of the mobile device may possibly be changed from the first state to at least one third state with an unknown position relative to the user, and changed from the third state to the second state. In some embodiments, the at least one third state may not be considered, and merely a start point (the first state) of the state change of the mobile device and an end point (the second state) of the change need to be known.

Definitely, a person skilled in the art may know, according to some embodiments of the present disclosure, the second state may not be the carry-on placing state, but is other state in which a position of the mobile device relative to the user needs to be known.

S130: Acquire position difference information between a second position of the mobile device relative to the user in the second state and the first position.

In some embodiments, the position difference information may be acquired by using a motion sensor. For example, the position difference information is acquired by using a combination of an acceleration sensor and an electronic gyroscope.

According to embodiments of the present disclosure, the position difference information is a relative position difference of the mobile device relative to the user. For example, when the user uses the mobile device, the user may also in a motion state. As an illustration, the user makes a phone call when walking and places the mobile device into a pocket after finishing the call, and in this case, data that reflect the motion of the user unrelated to the mobile device may be removed. For example, data corresponding to walking of the user is subtracted from data acquired by the motion sensor.

S140: Determine the second position according to the first position and the position difference information.

In some embodiments, the step S140 may calculate the second position by using the first position and the position difference information.

In some embodiments, a first correspondence of the first position, at least one position difference information and at least one second position can be obtained by using the first position and multiple pieces of position difference information through, for example, training or external acquisition. The position difference information obtained in step S130 is matched with the first correspondence, so as to obtain a second position closest to the position difference information.

For example, the first position is near the right ear of the user, and in this case, the obtained position difference information comprises: dropping by 60 cm and shifting rightwards by 13 cm. In the first correspondence, when the first position is near the right ear of the user, multiple pieces of position difference information corresponding to the first position are respectively corresponding to multiple second locates, for example, comprising: 1) the position difference information is: dropping by 20-25 cm, shifting leftwards by 2-5 cm, and shifting forwards by 4-5 cm; and the corresponding second position is the pocket at the right chest of the coat; 2) the position difference information is: dropping by 20-25 cm, shifting leftwards by 20-23 cm, and shifting forwards by 2-5 cm; and the corresponding second position is the pocket at the left chest of the coat; 3) the position difference information is: dropping by 55-65 cm, shifting rightwards by 10-15 cm; and the corresponding second position information is the trousers pocket at the right side of the user. By matching the position difference information described in the foregoing with multiple pieces of position difference information in the correspondence, it may be determined that the obtained position difference information is closest to one of the pre-stored position difference information. For example, it may be determined that the second position is the trousers pocket at the right side of the user.

In some embodiments, the motion posture information of the user may have some effects on the determination of the second position. For example, the position difference information from the position at the ear of the user to the trousers pocket may vary according to different postures of the user, for example a standing posture and a sitting posture of the user. Therefore, in some embodiments, the method further comprises:

acquiring motion information of the user and/or posture information of the user.

In this case, the step S140 comprises: determining the second position according to the motion information of the user and/or posture information of the user, the first position, and the position difference information.

In some embodiments, on the basis of the first correspondence, at least one motion information and/or at least one posture information may be further added into the correspondence, and therefore, In some embodiments, the second position is determined according to the position difference information and a second correspondence of the first position, at least one motion information and/or at least one posture information, at least one position difference information and at least one second position.

In the above description, the motion information of the user and/or the posture information of the user can refer to the motion information, or the posture information, or the motion information and the posture information.

In some embodiments, the first correspondence and the second correspondence may be comprehensive data synthesizing multiple user samples.

Each user can have personalized stature, dressing habits and the like. To improve the accuracy of determination of the second position, in some embodiments, the method may further comprise:

acquiring the first correspondence or the second correspondence corresponding to the user through learning.

In this way, the first correspondence or the second correspondence can be associated with the user, and when the second position is matched and determined, it may be more accurate.

Different function states may be needed according to different placing positions of the mobile device, and by using the mobile device being a mobile phone as an example, for example, when the mobile phone is placed in different pockets, positions of the human body being affected by the mobile phone radiation are different. Some positions are sensitive to the radiation, such as the head or reproductive system, and other positions are less sensitive, such as the buttocks. Further, when the mobile phone is placed in different pockets, the magnitude of vibration and the volume of the ringing prompt that need to be provided for the user in a case such as call reminder may also be different. For example, if the mobile phone is placed in the pocket of the coat, the vibration and ringing are easily noticed, and therefore, the vibration and ringing may be relatively small; and if the mobile phone is placed in the pocket at the buttocks, a strong vibration may be easy to attract attention of the user.

Therefore, in some embodiments, after the second position is obtained, the method further comprises:

determining at least one function state of the mobile device according to the second position.

The at least one function state may comprise, for example: a wireless transmission manner (power, direction, and the like), a mobile phone reminding manner, and the like.

A person skilled in the art should understand that in the above method of the specific implementation manner of the present disclosure, serial numbers of steps do not indicate priorities of execution sequences, the execution sequences of the steps should be determined according to functions and inner logic thereof, and should not constitute a limitation to implementation processes of the specific implementation manner of the present disclosure.

Figure 2:
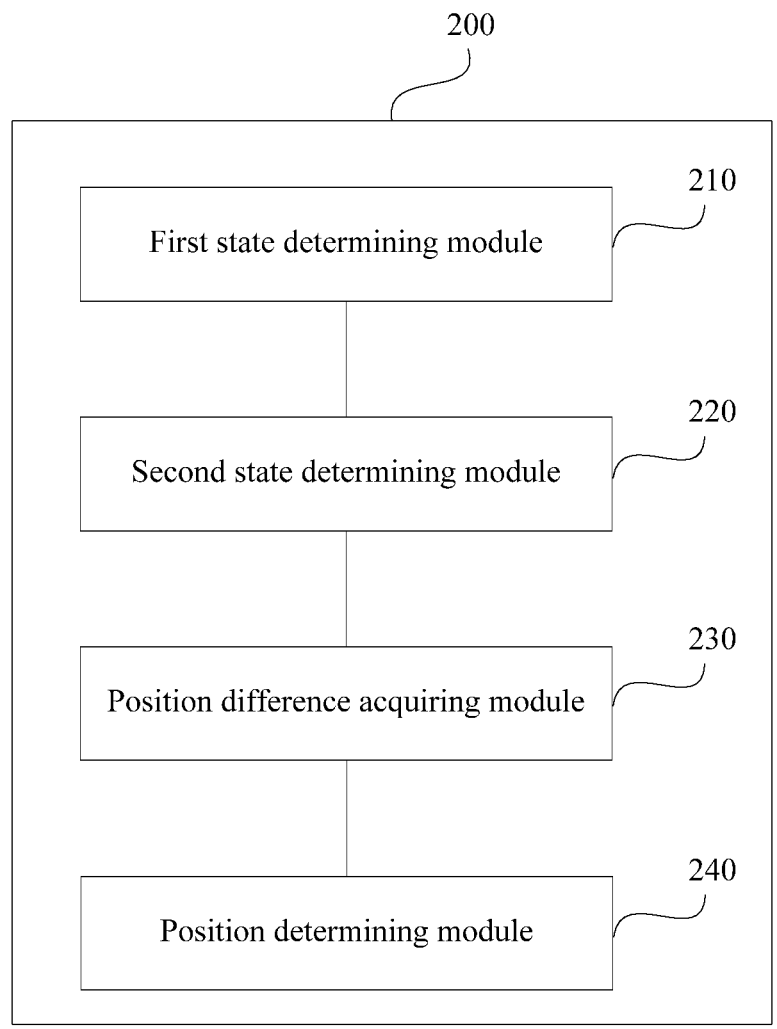
FIG. 2 is an example schematic structural block diagram of a mobile device position determining apparatus according to an embodiment of the present disclosure.

As shown in FIG. 2, embodiments of the present disclosure provide a mobile device position determining apparatus 200, comprising:

a first state determining module 210, configured to determine that a mobile device is in a first state, wherein in the first state, the mobile device is located at a first position relative to a user;

a second state determining module 220, configured to determine that a state of the mobile device is changed from the first state to a second state;

a position difference acquiring module 230, configured to acquire position difference information between a second position of the mobile device relative to the user in the second state and the first position; and a position determining module 240, configured to determine the second position according to the first position and the position difference information.

According to embodiments of the present disclosure, by using position difference information of a mobile device between a first state having a known position relative to a user and a second state having an un-known position relative to the user, a position of the mobile device relative to the user in the second state is determined; therefore, the positioning is convenient and precise, and makes previous preparations for adjusting function states thereof according to an environment where the mobile device is located.

The modules and units of embodiments of the present disclosure are determined according to the following implementation manner.

According to embodiments of the present disclosure, the first state is a state having a known first position. Specifically, the descriptions of the embodiments shown in FIG. 1 may be referred to, and are not repeated herein.

In some embodiments, the first sate comprises: a state of the mobile device being operated by the user. For example, a state of being operated by a finger of the user on the screen; or, a state of being held by the user to view text or video through the screen of the mobile device; or, the state of being held by the user at the ear for calling. According to the embodiments of the present disclosure, the granularity of the state division may be determined according to requirements on the precision, and specifically, the corresponding descriptions in the embodiments shown in FIG. 1 may be referred to.

In some embodiments, the first position corresponding to the first state can be a comprehensive value obtained by collecting many user samples.

In some embodiments, because of different statures, habits and the like of different users, first positions corresponding to that the different users use a mobile device in a first state varies. Thus, in order to improve the accuracy, a first position in a first state to a user could be acquired directed to the user. For example, a first position in a first state corresponding to a user can be acquired through learning.

Figure 3A:
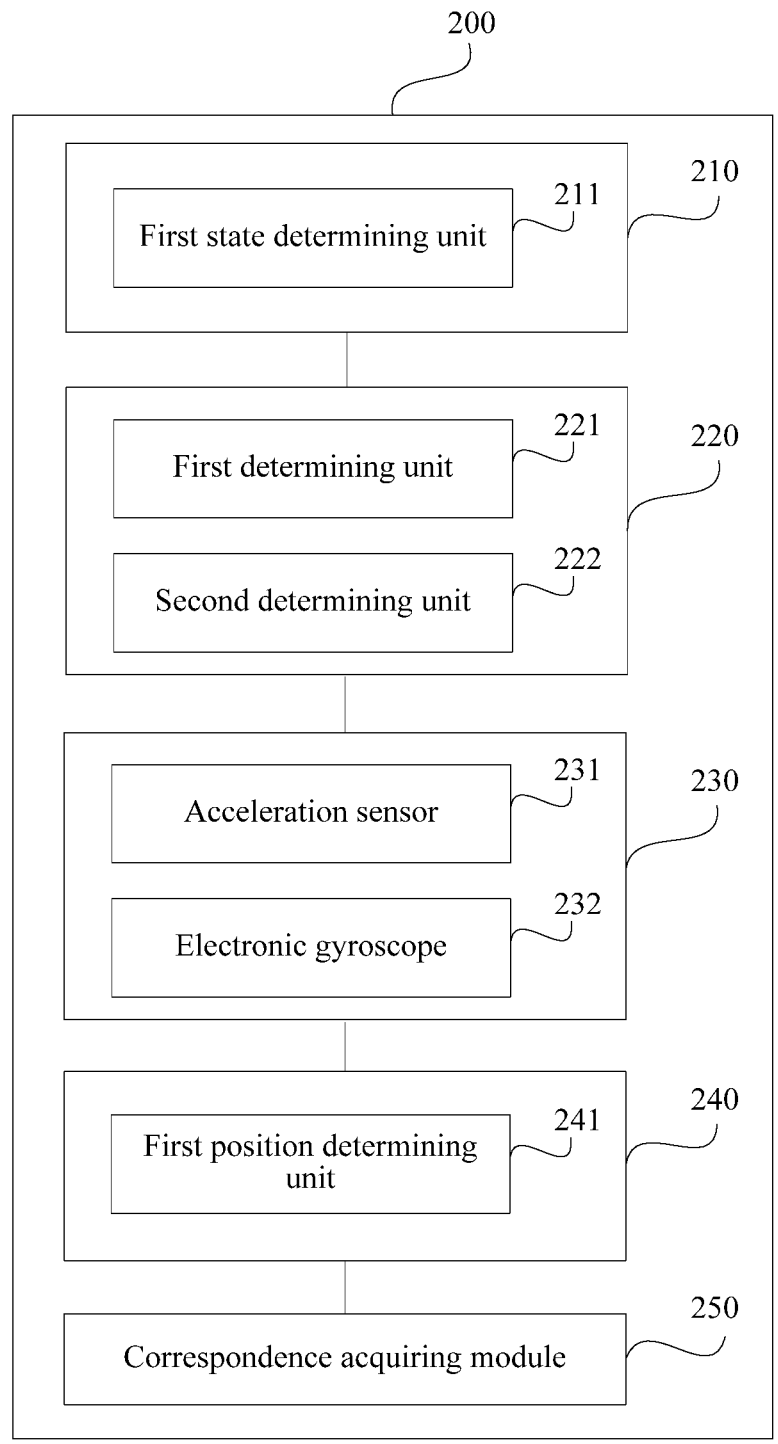
FIG. 3a and FIG. 3b are example schematic structural block diagrams of a mobile device position determining apparatus according to embodiments of the present disclosure.

As shown in FIG. 3a, in some embodiments, the first state determining module 210 comprises:

a first state determining unit 211, configured to determine that the mobile device is in the first state according to an instruction corresponding to an action of the user.

For example, when the user operates the screen, the first state determining unit 211 may determine, according to an instruction generated correspondingly when the user operates the screen, that the mobile device is in a first state of being operated by the user on the screen. As another example, when the user answering a phone call at the ear, the first state determining unit 211 may determine, according to a handheld detection, a proximity sensing detection, or an instruction corresponding to that the phone call is connected and the like, that the mobile device is in a first state of being answered by the user at the ear.

Moreover, the first state determining unit 211 may further determine, according to various manners such as a finger print, a palm print, or a pressure obtained from a fingerprint, palm print or pressure sensor, whether the mobile device is held by a hand, and which hand is operating the mobile device.

In some scenarios, a function state of the mobile device can be determined according to a place where the mobile device is placed by the user on the body, and therefore, In some embodiments, the second state comprises: a carry-on placing state of the mobile device.

The carry-on placing state comprises: a state in which the mobile device is placed in the pocket at the chest on the coat, the pocket at the hem of the coat, the pocket in the front of the trousers, the pocket at the back of the trousers, a carry-on bag, or other carry-on position(s) of the user.

When the mobile device is changed to the carry-on placing state, a position of the hand of the user can be changed from being on the mobile device to leaving the mobile device. In some embodiments, the second state determining module 220 comprises:

a first determining unit 221, configured to determine, at least according to that the mobile device is changed from a handheld state to a non-handheld state, that the mobile device is changed to the carry-on placing state.

In some embodiments, the determination of the handheld state may be performed by using data collected by a pressure sensor, an infrared detector, or a fingerprint reader at the periphery of the mobile device.

When an object is placed in a pocket or a bag, it can undergo a process of falling to stop. In some embodiments, the second state determining module 220 comprises:

a second determining unit 222, configured to determine, at least according to that a state of the mobile device is changed from a falling state to a stop falling state, that the mobile device is changed to the carry-on placing state.

This process may perform determination by using data collected by an acceleration sensor and the like.

In some embodiments, to improve the accuracy of determination, as shown in FIG. 3a, the second state determining module 220 may comprise both the first determining unit 221 and the second determining unit 222 to determine that the mobile device is changed to the carry-on placing state. Moreover, a person skilled in the art may know that, other possible determining unit may also be used in the embodiments of the present disclosure to determine that the mobile device is changed to the carry-on placing state, for example, the determination may be performed with the help of change of ambient light from a light state to a dark state.

In some embodiments, the mobile device may be directly changed from the first state to the second state. In another possible implementation manner, the mobile device may possibly be changed from the first state to at least one third state with an unknown position relative to the user, and changed from the third state to the second state. In this implementation manner, the at least one third state may not be considered, and merely a start point (the first state) of the state change of the mobile device and an end point (the second state) of the change need to be known.

Definitely, a person skilled in the art may know, in embodiments of the present disclosure, the second state may not be the carry-on placing state, but is other state in which a position of the mobile device relative to the user needs to be known.

In some embodiments, the position difference acquiring module 230 may comprise at least one motion sensor, for example, as shown in FIG. 3a, may comprise an acceleration sensor 231 to acquire acceleration information of the mobile device, and an electronic gyroscope 232 to acquire relative motion direction information of the mobile device, and the position difference information may be obtained according to the acceleration information and the relative motion direction information.

In the embodiments of the present disclosure, the position difference information is a relative position difference of the mobile device relative to the user, and In some embodiments, when the user uses the mobile device, the user may also in a motion state. For example, the user makes a phone call during the process of walking and places the mobile device into a pocket after finishing the call, and in this case, interference of the motion of the user unrelated to the mobile device may be removed. For example, a part corresponding to walking of the user is subtracted from data acquired by the motion sensor.

In some embodiments, as shown in FIG. 3a, the position determining module 240 comprises:

a first position determining unit 241, configured to determine the second position according to a first correspondence of the first position, at least one position difference information and at least one second position, and the position difference information. Specifically, the corresponding descriptions in the embodiments shown in FIG. 1 should be referred to.

In some embodiments, the first correspondence and the second correspondence may be comprehensive data synthesizing multiple user samples.

Each user has own personalized stature, dressing habits and the like, in order that obtained second position is more accurate, in this implementation manner, the apparatus 200 may further comprise:

a correspondence acquiring module 250, configured to acquire the first correspondence corresponding to the user through learning.

Definitely, a person skilled in the art may know that, in another possible implementation manner, the correspondence acquiring module 250 may, for example, acquire the first correspondence from an external device or from a storage module.

Figure 3B:
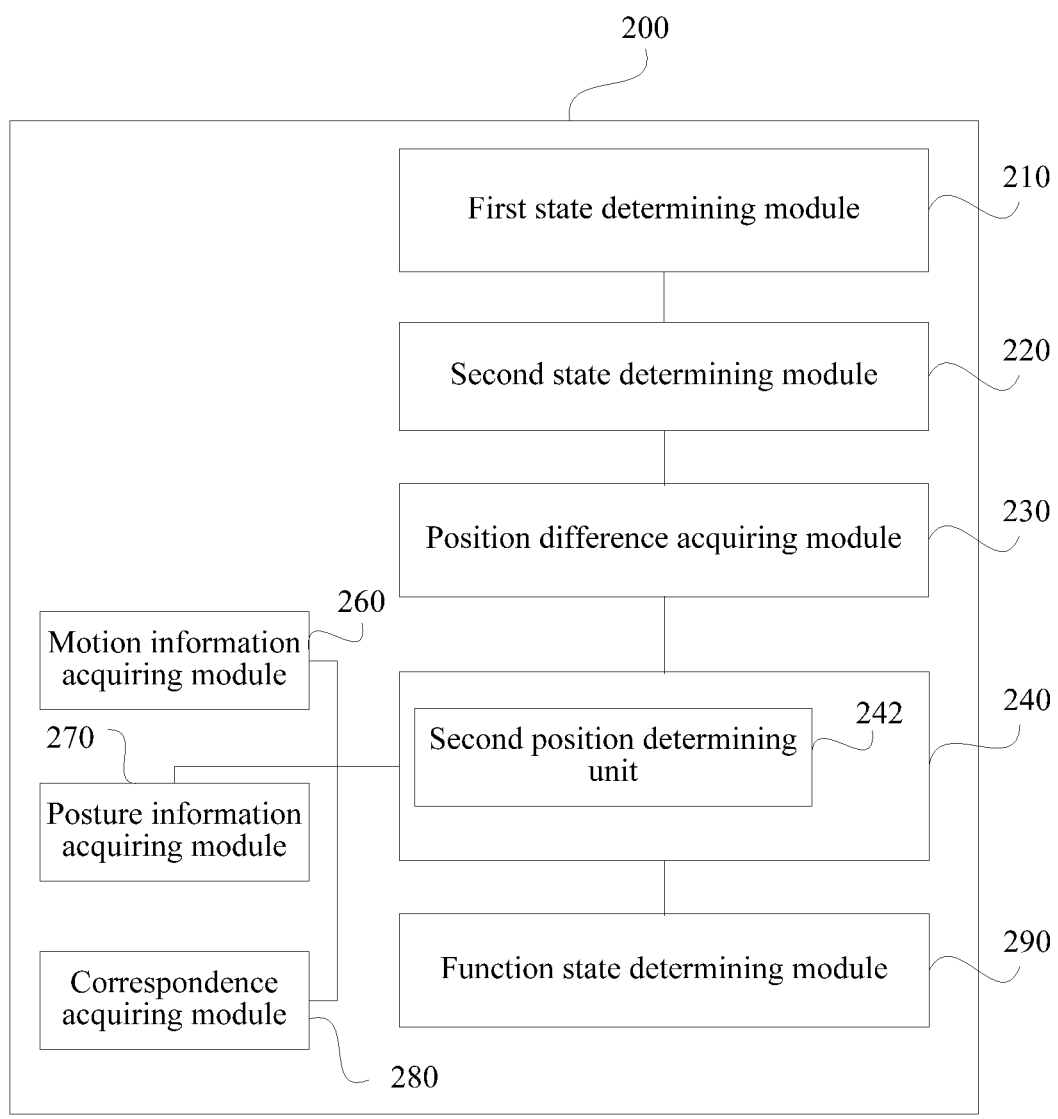

In some possible implementation manners, the motion posture information of the user may have some effects on the determination of the second position. For example, the position difference information from the position at the ear of the user to the trousers pocket may vary according to different postures of the user, for example a standing posture and a sitting posture of the user. Therefore, as shown in FIG. 3b, in another possible implementation manner, the apparatus 200 further comprises:

a motion information acquiring module 260, configured to acquire motion information of the user; and a posture information acquiring module 270, configured to acquire posture information of the user.

Definitely, in some possible implementation manner, the apparatus 200 may merely comprises one of the motion information acquiring module 260 and the posture information acquiring module 270.

In this implementation manner, the position determining module 240 comprises:

a second position determining unit 242, configured to determine the second position according to the motion information of the user, the posture information of the user, the first position, and the position difference information.

In some embodiments, the position determining unit 240 may determine the second position according to a second correspondence of the first position, at least one motion information, at least one posture information, at least one position difference information and at least one second position, and the position difference information. The specific manner is similar to the determination of the second position according to the first correspondence, and is not repeated herein.

In some embodiments, the apparatus 200 further comprises:

a correspondence acquiring module 280, configured to acquire the second correspondence corresponding to the user through learning.

In some embodiments, the correspondence acquiring module 280 may, for example, acquire the second correspondence from an external device or from a storage module.

The mobile device may include different function states according to different placing positions. As shown in FIG. 3b, in some embodiments, the apparatus 200 further comprises:

a function state determining module 290, configured to determine at least one function state of the mobile device according to the second position.

The at least one function state may comprise, for example: a wireless transmission manner (power, direction, and the like), a mobile phone reminding manner, and the like, and specifically, the corresponding descriptions in the embodiments shown in FIG. 1 may be referred to.

Figure 4:
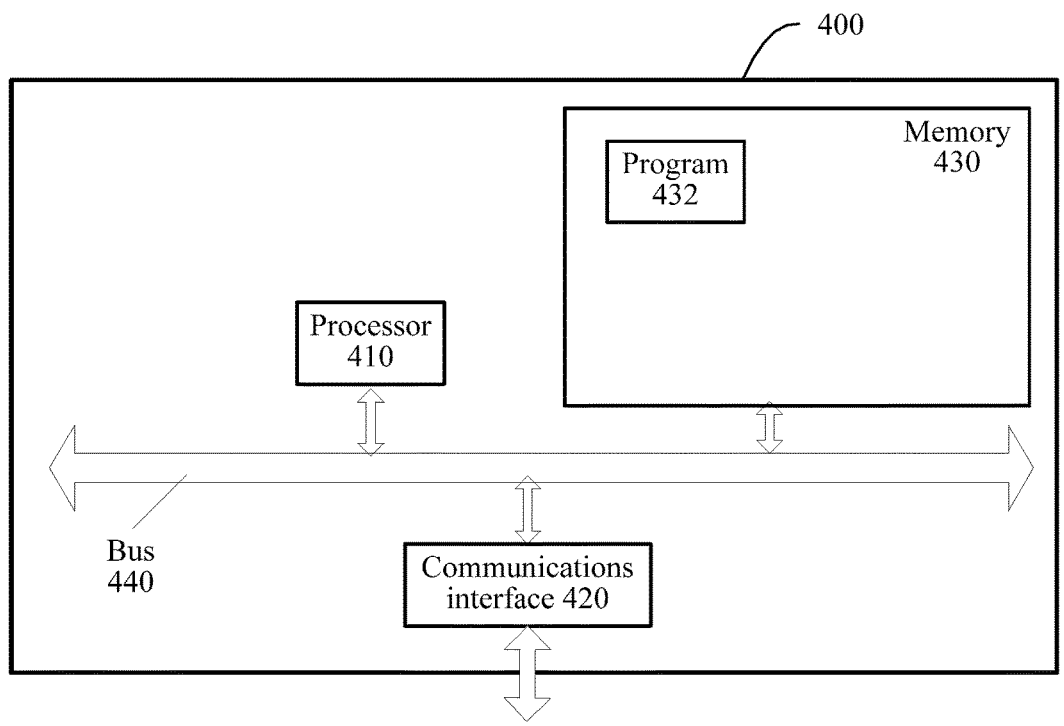
FIG. 4 is an example schematic structural block diagram of a mobile device position determining apparatus according to an embodiment of the present disclosure.

FIG. 4 is a schematic structural diagram of another mobile device position determining apparatus 400 according to an embodiment of the present disclosure. The specific embodiment of the present disclosure does not make any limitation on specific implementation of the mobile device position determining apparatus 400. As shown in FIG. 4, the mobile device position determining apparatus 400 may comprise:

A processor 410, a communications interface 420, a memory 430, and a communications bus 440, where:

The processor 410, the communications interface 420, and the memory 430 complete mutual communications with each other through the communications bus 440.

The communications interface 420 is configured to communicate with a network element such as a client.

The processor 410 is configured to execute a program 432, and may specifically execute relevant steps in the above method embodiment.

Specifically, the program 432 may comprise a program code. The program code comprises a computer operating instruction.

The processor 410 may be a central processing unit CPU or an Application Specific Integrated Circuit (ASIC), or be configured to be one or more integrated circuits configured to implement the embodiments of the present disclosure.

The memory 430 is configured to store the program 432. The memory 430 may comprise a high-speed RAM memory and may also further comprise a non-volatile memory, for example, at least one magnetic disk memory. The program 432 may be specifically used to cause the mobile device position determining apparatus 400 to execute the following steps:

determining that a mobile device is in a first state, wherein in the first state, the mobile device is located at a first position relative to a user;

determining that the mobile device is changed from the first state to a second state;

acquiring position difference information between a second position of the mobile device relative to the user in the second state and the first position; and determining the second position at least according to the first position and the position difference information.

Specific implementations of all steps in the program 432 may be referred to in the corresponding descriptions of the corresponding steps or units in the above embodiments, and are not repeated herein. It can be clearly understood by persons skilled in the art that, for the purpose of convenient and brief description, for a detailed working process of the described devices and modules, reference may be made to the corresponding process in the foregoing method embodiment, and the details will not be described herein again.

Figure 5:
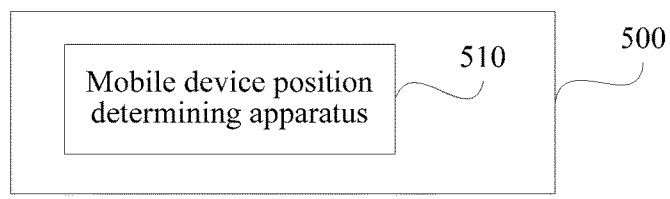
FIG. 5 is an example schematic structural block diagram of a mobile device according to an embodiment of the present disclosure.

As shown in FIG. 5, an embodiment of the present disclosure further provides a mobile device 500, and the mobile device 500 comprises the mobile device position determining apparatus 510 described in FIG. 2, FIG. 3*a*, FIG. 3*b* or FIG. 4.

In some embodiments, the mobile device 500 may be, for example, a mobile phone, a tablet computer, or the like.

Persons of ordinary skill in the art should appreciate that, in combination with the examples described in the embodiments herein, units and method steps can be implemented by electronic hardware, or a combination of computer software and electronic hardware. Whether the functions are executed by hardware or software depends on specific applications and design constraint conditions of the technical solutions. Persons skilled in the art can use different methods to implement the described functions for every specific application, but it should not be considered that this implementation goes beyond the scope of the present disclosure.

When being implemented in the form of a software functional unit and sold or used as a separate product, the functions may be stored in a computer-readable storage medium. Based on such understanding, the technical solutions of the present disclosure essentially, or the part contributing to the prior art, or part of the technical solutions may be implemented in a form of a software product. The computer software product is stored in a storage medium, and comprises several instructions for instructing a computer device (which may be a personal computer, a server, a network device, and the like) to execute all or part of the steps of the method described in each of the embodiments of the present disclosure. The aforementioned storage medium comprises: any medium that can store program codes, such as a USB disk, a removable hard disk, a read-only memory (ROM), a random access memory (RAM), a magnetic disk, or an optical disc.

The aforementioned description of the implementation manners are merely provided for describing the present disclosure, but not intended to limit the present disclosure. Persons of ordinary skills in the art can also make many variations and changes without departing from the spirit and the scope of the present disclosure. Therefore, all the equivalent technical solutions also fall within the scope of the present disclosure, and the patent protection scope of the present disclosure shall be limited by the claims.

What is claimed is:

1. A mobile device position determining method implemented by a system comprising a processor, comprising:
   determining that a mobile device is in a first state, wherein in the first state, the mobile device is located at a first position relative to a user;
   determining that the mobile device is changed from the first state to a second state;
   acquiring position difference information between a second position of the mobile device relative to the user in the second state and the first position;
   acquiring motion information and posture information of the user;
   acquiring a correspondence corresponding to the user's personalized data through learning; and
   determining the second position at least according to the first position, the motion information, the posture information, the position difference information, and the correspondence.

2. The method of claim 1, wherein the determining that the mobile device is in the first state comprises:
   determining that the mobile device is in the first state according to an instruction corresponding to an action of the user.

3. The method of claim 1, wherein the first state comprises: a state of the mobile device being operated by the user.

4. The method of claim 1, wherein the second state comprises:
   a carry-on placing state of the mobile device.

5. The method of claim 4, wherein determining that the mobile device is changed to the carry-on placing state comprises:
   determining, at least according to that the mobile device is changed from a handheld state to a non-handheld state, that the mobile device is changed to the carry-on placing state.

6. The method of claim 4, wherein the determining that the mobile device is changed to the carry-on placing state comprises:
   determining, at least according to that the mobile device is changed from a falling state to a stop falling state, that the mobile device is changed to the carry-on placing state.

7. The method of claim 1, wherein the determining the second position at least according to the first position, the motion information, the posture information, the position difference information, and the correspondence comprises:

determining the second position according to a correspondence of the first position, at least one position difference information and at least one second position, and the position difference information.

8. The method of claim 1, wherein the determining the second position at least according to the first position, the motion information, the posture information, the position difference information, and the correspondence comprises:
determining the second position according to a correspondence of the first position, at least one motion information and/or at least one posture information, at least one position difference information and at least one second position, and the position difference information.

9. The method of claim 1, further comprising:
determining at least one function state of the mobile device according to the second position.

10. A mobile device position determining apparatus, comprising:
a processor, coupled to a memory, that executes or facilitates execution of executable modules, the executable modules comprising:
a first state determining module, configured to determine that a mobile device is in a first state, wherein in the first state, the mobile device is located at a first position relative to a user;
a second state determining module, configured to determine that the mobile device is changed from the first state to a second state;
a position difference acquiring module, configured to acquire position difference information between a second position of the mobile device relative to the user in the second state and the first position;
a motion information acquiring module, configured to acquire motion information of the user;
a posture information acquiring module, configured to acquire posture information of the user;
a correspondence acquiring module, configured to acquire a correspondence corresponding to the user's personalized data through learning; and
a position determining module, configured to determine the second position at least according to the first position, the motion information, the posture information, the position difference information, and the correspondence.

11. The apparatus of claim 10, wherein the first state determining module comprises:
a first state determining unit, configured to determine that the mobile device is in the first state according to an instruction corresponding to an action of the user.

12. The apparatus of claim 10, wherein the first state comprises: a state of the mobile device being operated by the user.

13. The apparatus of claim 10, wherein the second state comprises:
a carry-on placing state of the mobile device.

14. The apparatus of claim 13, wherein the second state determining module comprises:
a first determining unit, configured to determine, at least according to that the mobile device is changed from a handheld state to a non-handheld state, that the mobile device is changed to the carry-on placing state.

15. The apparatus of claim 13, wherein the second state determining module comprises:
a second determining unit, configured to determine, at least according to that a state of the mobile device is changed from a falling state to a stop falling state, that the mobile device is changed to the carry-on placing state.

16. The apparatus of claim 10, wherein the position determining module comprises:
a first position determining unit, configured to determine the second position according to a correspondence of the first position, at least one position difference information and at least one second position, and the position difference information.

17. The apparatus of claim 10, wherein the position determining module is further configured to:
determine the second position according to a correspondence of the first position, at least one motion information and/or at least one posture information, at least one position difference information and at least one second position, and the position difference information.

18. The apparatus of claim 10, wherein the executable modules comprise:
a function state determining module, configured to determine at least one function state of the mobile device according to the second position.

19. A mobile device, comprising the mobile device position determining apparatus of claim 10.

20. A non-transitory computer readable storage medium that stores executable instructions that, when executed by an apparatus comprising a processor, causes the apparatus to perform a mobile device position determining method, the method comprising:
determining that a mobile device is in a first state, wherein in the first state, the mobile device is located at a first position relative to a user;
determining that a state of the mobile device is changed from the first state to a second state;
acquiring position difference information between a second position of the mobile device relative to the user in the second state and the first position;
acquiring motion information and posture information of the user;
acquiring a correspondence corresponding to the user's personalized data through learning; and
determining the second position at least according to the first position, the motion information, the posture information the position difference information, and the correspondence.

* * * * *